3,524,634
PNEUMATIC SHOCK ABSORBER ARRANGEMENT
Peter Schmidt, Dabringhausen, Germany, assignor to
Hoesch Aktiengesellschaft, Dortmund, Germany
Original application Sept. 6, 1966, Ser. No. 577,253.
Divided and this application Oct. 14, 1968, Ser. No.
767,150
Claims priority, application Germany, Sept. 9, 1965,
H 57,120
Int. Cl. B60g 17/06
U.S. Cl. 267—65         10 Claims

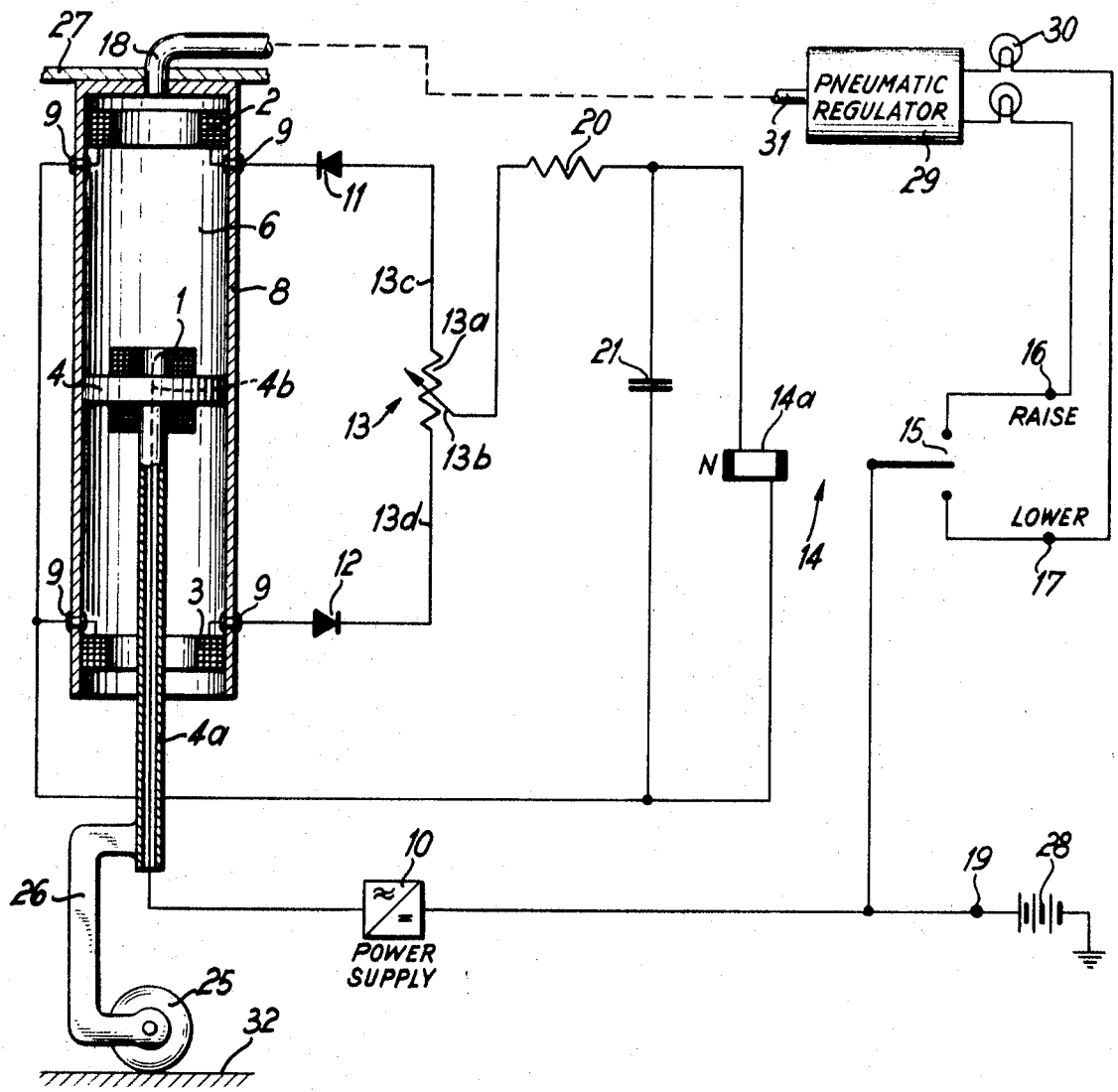

ABSTRACT OF THE DISCLOSURE

A pneumatic shock absorber arrangement for use in motor vehicles. A cylinder and piston assembly has provision for admitting and exhausting gas under pressure to and from the cylinder. Electromagnetic coils are mounted at each of the ends of the cylinder associated with the limits of the piston travel. The wheel of the motor vehicle which is to be stabilized with respect to a reference datum, is mounted to the piston. A third electromagnetic coil is secured to the piston and movable therewith. An electrical power supply energizes this third coil mounted on the movable piston. Depending upon the motion and displacement of the piston, voltage signals are induced at the two fixed coils at both ends of the cylinder. The induced voltage signals of the two coils at the ends of the cylinder are applied to a comparator which compares the signals and actuates the valves of a pneumatic regulator. Depending upon the state of the valves, the pneumatic regulator will either admit air under pressure into the cylinder or exhaust air therefrom. By operating the pneumatic regulator in conjunction with the electrical comparator, the amount of compressed gas within the cylinder is regulated so that the piston to which the wheel of the motor vehicle is attached, is maintained stable with respect to a fixed reference datum.

CROSS REFERENCE TO A RELATED APPLICATION

This application is a divisional application of the co-pending parent application Ser. No. 577,253, filed Sept. 6, 1966, and since abandoned.

BACKGROUND OF THE INVENTION

The present invention relates to a pneumatic shock absorber arrangement, particularly applicable to motor vehicles, with an electrical control circuit for regulating the shock absorber.

Pneumatic shock absorbers for motor vehicles, as commonly known in the art, comprise a piston and cylinder arrangement whereby the piston is connected to the wheel of the motor vehicle and the cylinder is secured to the chassis or body of the vehicle. Any irregularities experienced by the wheel on the road and causing vertical motion of the wheel, results in corresponding displacements of the piston relative to the cylinder. These relative displacements are sensed by a control circuit which operates to cause the piston to be returned to its original position. This original position marks the stable position for the chassis of the motor vehicle and is to be maintained by the control system. Thus, in order to retain the chassis or body of the vehicle stable or at constant level with respect to a reference datum, it is desirable to retain the piston at a particular or stable position with respect to the cylinder.

Heretofore, shock absorbers for motor vehicles which operated in conjunction with control circuit, were not satisfactory because they did not provide reliable operation, were complex in design, and uneconomical. Furthermore, such control circuits included mechanically sliding contacts which provided unsatisfactory operation.

Accordingly, it is an object of the present invention to provide a pneumatic shock absorber arrangement having a control circuit that operates reliably.

Another object of the present invention is to provide a pneumatic shock absorber arrangement with electrical control circuit, as set forth, whereby proper operation of the shock absorber is realized without shattering switching effects due to mechanical sliding contacts.

A further object of the present invention is to provide a pneumatic shock absorber arrangement, of the character described, which is of simple design and may be readily manufactured.

A still further object of the present invention is to provide a pneumatic shock absorber arrangement, of the character described, which may be produced economically.

With the above objects in view the invention includes a piston and cylinder arrangement wherein the piston is mechanically coupled to the wheel, and the cylinder is secured to the chassis or body of the motor vehicle. The piston carries a coil resulting in an electromagnetic field through the application of an alternating voltage to the coil. The cylinder has two stationary coils each at one end of the cylinder. The coil mounted on the piston and movable therewith, induces voltages in the two stationary coils mounted at the ends of the cylinder. The algebraic summation of the induced voltages emitted by the two stationary coils provides an indication of the position of the piston relative to these stationary coils. This summation of the induced voltages is performed in a resistance summing network, and the resulting signal from the network is applied to a polarized relay which is actuated to one or a second state, depending upon the position of the piston within the cylinder. The actuation of the relay causes the operation of a pneumatic regulator which adds or withdraws air from the cylinder, and thereby retains the cylinder at a desired relative position with respect to the piston. The polarized relay is operated in conjunction with a delay circuit which minimizes oscillatory conditions of the relay.

The novel features which are considered as characteristic for the present invention are set forth in particular in the appended claims. The invention itself, however, both as to its construction and its method of operation together with additional objects and advantages thereof, will be best understood from the following description of specific embodiments when read in connection with the accompanying drawing.

BRIEF DESCRIPTION OF THE DRAWING

A functional schematic diagram showing the mechanical and electrical components of the arrangement, and the manner in which they cooperate and interact.

DESCRIPTION OF THE PREFERRED EMBODIMENTS

Referring to the drawing the pneumatic cylinder arrangement comprises a piston 4 slidable within a cylinder 8. The piston rod 4a movable with the piston 4, is mechanically coupled to the wheel 25 of the motor vehicle by way of the connecting link or arm 26. The cylinder 8, on the other hand, is secured to, for example, the chassis or body 27 of the motor vehicle. The cylinder 8 is closed at the upper end, and open at the lower end. The upper closed end of the cylinder 8 is adapted to retain a tube or conduit 18 communicating with the interior of the cylinder. The piston 4 and interior wall of the cylinder 8 are dimensioned so that the piston is slidable within the cylinder without permitting air to pass between the piston and the cylinder.

An electromagnetic coil 1 is secured to the piston 4 and travels therewith. Electromagnetic coils 2 and 3 are mounted, respectively, at the upper and lower ends of the cylinder 8 and, as is obvious from the drawing, coils 2 and 3 have a toroidal cross section while the diameter of coil 1 is substantially equal to the central opening of each of the toroidal cross sections whereby, in either of the extreme positions of the piston 4, coil 1 may be moved within the corresponding coil 2 or coil 3. These three electromagnetic coils comprise a differential transformer wherein coil 1 corresponds to the primary winding and coils 2 and 3 are the secondary windings. The conductor 4b leading to and energizing the coil 1 is brought to the exterior of the cylinder arrangement by passing through the interior of the piston rod 4a. The conductor 4b connects to a power supply 10 which provides the coil 1 with an alternating voltage. The power supply 10, for example, is adapted, in the commonly-known manner, to convert direct current obtained from the battery 28 to a corresponding alternating signal. The source of energy may thus be the battery 28 normally within the motor vehicle, and the positive terminal 19 of the battery, connects to the power supply or converter 10.

With an alternating signal impressed upon the coil 1, corresponding alternating signals or voltages are induced in the secondary windings 2 and 3. Depending upon the position of the piston 4 in relation to the coils 2 and 3, larger or smaller signals are induced in either one of them. The output terminals 9 of the coils 2 and 3 are connected, by way of diodes 11 and 12, to a summing device 13. The summing device 13 may be in the form of the commonly-known potentiometer having a winding 13a and a sliding contact 13b movable therealong. The output terminals of the diodes 11 and 12 are connected to the two terminals of the winding 13a of the potentiometer or variable resistor 13, while the sliding contact 13b is connected to a resistor 20. Thus, the winding 13a and sliding contact 13b form a resistance summing network for combining algebraically the signals derived from the secondary windings 2 and 3. The diodes 11 and 12 serve to rectify the alternating signals emitted by the coils 2 and 3, into corresponding direct current signals for application to the winding 13a.

The signals representing the algebraic sum of the signals emitted by the coils 2 and 3, and available at the sliding contact 13b is applied to a polarized relay 14 by way of the resistor 20. The relay 14 is bi-directional and may be actuated to one or another state depending upon the polarity of the current applied to the coil of the relay.

In operation, the relay 14 will be actuated to its first or second state depending upon whether the piston 4, and hence coil 1, is closer to the secondary windings 2 or 3. For example, the polarity arrangement of the coils 2 and 3 is such that when the coil 1 is closer to coil 2 than coil 3, the signal, emitted by the coil 2 after comparison with the signal from coil 3 by the summing device 13, provides a resulting signal at the sliding contact 13b, which is of the polarity that causes relay 14 to be actuated to its first state. When, on the other hand, the piston 4, and hence coil 1, is closer to coil 3, the opposite result is obtained, and relay 14 is actuated to its second state. The relay 14 comprises the polarized coil 14a and a switching contact 15. In the deenergized state of the coil 14a the switching contact 15 is in a neutral position as shown in the drawing. When the piston 4 is closer to coil 3 than that desired, the switching contact 15 is operated to connect with the terminal 17 so as to provide a signal which will result in the lowering of the cylinder and causing the latter to be relative to the piston in the originally desired position. When, on the other hand, the piston 4 is closer to coil 2 than desired, the switching contact 15 connects with terminal 16 resulting in a subsequent raising of the cylinder.

The raising or lowering of the cylinder 8 with respect to the piston 4 is accomplished through a pneumatic regulator 29 operating in conjunction with magnetic valves 30. The latter are actuated through corresponding electrical signals prevailing at terminals 16 and 17. When the piston 4 has moved away from its desired position and toward the coil 2, the circuit is operated so that swtiching contact 15 connects with terminal 16. This actuates the corresponding magnetic valve 30 and operates, in turn, the pneumatic regulator 29 so as to introduce compressed air into the upper chamber 6 by way of the tube 18 connected to the outlet 31 of the regulator. The introduction of the compressed air into the upper chamber 6, causes the cylinder 8 to be raised with respect to the piston 4, and consequently the chassis 27 connected to the cylinder 8, is raised correspondingly. When, on the other hand, the piston 4 moves away from its designated and desired position, and toward the coil 3, switching contact 15 connects with terminal 17, and the corresponding magnetic valve 30 is actuated to allow air to flow out of the chamber 6 by way of the pneumatic regulator 29. By permitting air to flow from the chamber 6, in this manner, the weight of the chassis 27 causes a lowering of the cylinder 8 with respect to the piston 4, and hence the latter is returned to its original relative position.

It may be seen from the preceding description, therefore, that any vertical motions of the wheel 25 due to irregularities in the road 32, and reflected in corresponding motions of the piston 4, are compensated for by equivalent movements of the cylinder 8 due to the action of the pneumatic regulator 29.

If, for a particular configuration of the system, the coils 2 and 3 have equal properties, and the potentiometer winding 13a is linear, null voltage will prevail at the sliding contact 13b when the latter is at the center position of the potentiometer and coil 1 is equidistant from coils 2 and 3. Under these circumstances the coil 14a will be in its deenergized state, and consequently the switching contact 15 will be in its neutral position. By inserting resistance in series with either of the connections 13c and 13d leading to the potentiometer winding 13a, however, it is possible to shift the null position of the sliding contact 13b. This principle may be employed to locate the sliding contact 13b with respect to the winding 13a so as to compensate for component differences in the coils 2 and 3, as well as the diodes 11 and 12. This principle is also directly applicable to establish the stable position of cylinder 8 with respect to piston 4 at any desired position. Thus, if it is desired that this stable position be not coincident with the point at which the piston 4 is equidistant from the coils 2 and 3, the insertion of resistance within the connections 13c and 13d, for example, will allow this stable position to be established at any desired point along the length of the cylinder. Accordingly, through proper insertion of resistance within the connections 13c and 13d, a null voltage may be realized at the output of the sliding contact 13b when the piston 4 is closer or further from one of the coils 2 and/or 3.

Under normal conditions, the motion of the piston 4 with respect to the cylinder 8 and the reaction of the electrical control system thereto, may result in oscillatory current being applied to the relay coil 14a, and hence in an oscillating condition of the switching contact 15. To minimize such oscillation, a capacitor 21 is connected in parallel with the relay coil 14a. The capacitor 21 in conjunction with the resistor 20 form a delay circuit whereby the oscillatory effects of the current applied to the relay coil 14a are substantially suppressed.

While the invention has been illustrated and described as embodied in a shock absorber particularly for motor vehicles, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A pneumatic spring arrangement for a vehicle including body means and wheel means supporting said body means; a pneumatic cylinder mounted on one of said means extending in vertical direction; a piston mounted on the other of said means slidably in said cylinder so as to form a pneumatic compression space therein; a conduit system for admitting gaseous medium under pressure into said compression space of said cylinder under one condition of operation included in said system; an exhaust conduit for exhausting gaseous medium from said pressure space in said cylinder under another condition of operation; electrically actuable pressure valve means in said conduit system; electrically actuable exhaust valve means located in said exhaust conduit; first and second electrical coils mounted on said cylinder spaced in longitudinal direction thereof; a third electrical coil carried by said piston movably therewith; a source of electric current; a circuit including said source of electric current and said coils so that movement of said piston and said third coil carried by the same in said cylinder between said first and second coils will cause changes in the first and second currents induced in said first and second coils, respectively; electrical comparator means deriving from said changes of said first and second induced electric currents actuating signals; and actuating means actuated by said actuating signals for actuating said pressure valve means and said exhaust valve means, respectively, so as to open said pressure valve means when said piston moves in said one condition of operation to reduce said compression space and to open said exhaust valve means when said piston moves in said other condition of operation to increase said compression space.

2. The pneumatic spring arrangement for a vehicle as defined in claim 1 wherein said conduit system and said exhaust conduit are a single gas confining and conducting tube means communicating with said cylinder through an opening thereof.

3. The pneumatic spring arrangement for a vehicle as defined in claim 2 including pneumatic regulating means operated by said pressure and said exhaust valve means and connected to said gas confining and conducting tube means for regulating both the amount of compressed gas admitted to said cylinder and exhausted from said cylinder.

4. The pneumatic spring arrangement for a vehicle as defined in claim 1 including pneumatic regulating means operated by said pressure and said exhaust valve means for regulating the amount of gas flow to and from said cylinder through said conduit system and said exhaust conduit.

5. The pneumatic spring arrangement for a vehicle as defined in claim 1 wherein said first and second electrical coils are of toroidal cross section, the diameter of said third electrical coil being equal to the central opening of said toroidal cross section so that said third coil may be moved within said first and second electrical coils.

6. The pneumatic spring arrangement for a vehicle as defined in claim 5 wherein said first electrical coil is mounted within said cylinder at one end of the path of motion of said piston and said second electrical coil is mounted at the other end of the path of motion of said piston.

7. The pneumatic spring arrangement for a vehicle as defined in claim 1 including pneumatic regulating means communicating with said cylinder through an opening thereof and containing said conduit system and including said exhaust conduit, said pneumatic regulating means being operatively coupled to said pressure valve means and said exhaust valve means, whereby said pneumatic regulating means regulates the flow of said gaseous medium to and from said cylinder for stabilizing said cylinder with respect to a reference datum in space.

8. The pneumatic spring arrangement for a vehicle as defined in claim 1 wherein said comparator means is an electrical potentiometer having an electrical resistance winding connected to said first and second electrical coils.

9. The pneumatic spring arrangement for a vehicle as defined in claim 8 wherein said actuating means is electromechanical relay means connected to said potentiometer means and actuating said valve means depending upon a predetermined relationship between said first and second currents induced in said first and second coils, respectively.

10. The pneumatic spring arrangement for a vehicle as defined in claim 1 wherein said source of electrical current comprises the vehicle battery.

References Cited

UNITED STATES PATENTS 2,943,851   7/1960   Sampietro _____ 267—65
3,124,368   3/1964   Corley et al. _____ 280—124 X A. HARRY LEVY, Primary Examiner U.S. Cl. X.R.

280—124, 6; 92—5; 91—390; 317—150